(12) United States Patent
Park

(10) Patent No.: US 11,825,235 B2
(45) Date of Patent: Nov. 21, 2023

(54) ELECTRONIC DEVICE FOR PROCESSING IMAGE AND IMAGE PROCESSING METHOD THEREOF

(71) Applicant: SAMSUNG ELECTRONICS CO., LTD., Suwon-si (KR)

(72) Inventor: Chansik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/555,290

(22) Filed: Dec. 17, 2021

(65) Prior Publication Data

US 2022/0116566 A1 Apr. 14, 2022

Related U.S. Application Data

(63) Continuation of application No. PCT/KR2020/006832, filed on May 27, 2020.

(30) Foreign Application Priority Data

Jun. 28, 2019 (KR) .......................... 10-2019-0078314

(51) Int. Cl.
H04N 7/01 (2006.01)
(52) U.S. Cl.
CPC .................................. H04N 7/0125 (2013.01)
(58) Field of Classification Search
CPC ............ H04N 7/0125; H04N 21/4147; H04N 21/4408; H04N 21/411; H04N 21/4344; H04N 21/4345; H04N 21/4363; H04N 21/440245; H04N 21/44029; H04N 21/4518; H04N 21/4122; H04N 5/202; H04N 21/4351; H04N 21/4353;
(Continued)

(56) References Cited

U.S. PATENT DOCUMENTS 10,735,688 B2   8/2020 Bak et al.
11,477,383 B2 * 10/2022 Park ..................... H04N 23/632
(Continued)

FOREIGN PATENT DOCUMENTS

KR   10-2008-0058703 A   6/2008
KR   10-2010-0081886 A   7/2010
(Continued)

OTHER PUBLICATIONS

Korean Office Action dated Aug. 11, 2023 for KR Application No. 10-2019-0078314.

Primary Examiner — Michael Lee
(74) Attorney, Agent, or Firm — Nixon & Vanderhye P.C.

(57) ABSTRACT

An electronic device according to an embodiment of the disclosure includes: a memory, and a processor electrically connected to the memory, wherein the memory stores a high dynamic range image and dynamic metadata including dynamic tone mapping information corresponding to a plurality of frames included in the high dynamic range image, and wherein the memory stores instructions that, when executed, cause the processor to: control the electronic device to transmit a packet including data obtained by combining one frame among the plurality of frames and a part of the dynamic metadata corresponding to the one frame among the dynamic metadata to an external electronic device in response to an image request from the external electronic device.

17 Claims, 10 Drawing Sheets

(58) Field of Classification Search
CPC .... H04N 21/4621; G09G 5/005; G09G 5/006; G09G 5/10; G06T 5/009
See application file for complete search history.

(56) References Cited

U.S. PATENT DOCUMENTS

| | | | |
|---|---|---|---|
| 2015/0201222 A1 | 7/2015 | Mertens | |
| 2015/0341611 A1* | 11/2015 | Oh | G06F 3/14 |
| | | | 386/230 |
| 2016/0173811 A1* | 6/2016 | Oh | H04N 7/015 |
| | | | 725/116 |
| 2017/0006336 A1* | 1/2017 | Lee | H04L 1/0045 |
| 2017/0256039 A1 | 9/2017 | Hsu et al. | |
| 2018/0030841 A1 | 2/2018 | Lang et al. | |
| 2019/0387134 A1* | 12/2019 | Kozuka | H04N 21/47 |
| 2019/0394384 A1* | 12/2019 | Yamamoto | H04N 1/6027 |
| 2021/0052344 A1* | 2/2021 | Cuypers | A61L 31/14 |
| 2021/0076042 A1 | 3/2021 | Choudhury et al. | |
| 2021/0084257 A1* | 3/2021 | Yuan | H04N 7/0885 |

FOREIGN PATENT DOCUMENTS

| | | |
|---|---|---|
| KR | 10-2016-0040959 | 4/2016 |
| KR | 10-2016-0074970 | 6/2016 |
| KR | 10-2018-0013879 | 2/2018 |
| KR | 10-2018-0030841 | 3/2018 |
| KR | 10-2019-0008070 | 1/2019 |
| WO | 2019/050972 | 3/2019 |

\* cited by examiner

ELECTRONIC DEVICE FOR PROCESSING IMAGE AND IMAGE PROCESSING METHOD THEREOF

CROSS-REFERENCE TO RELATED APPLICATIONS

This application is a continuation of International Application No. PCT/KR2020/006832 designating the United States, filed on May 27, 2020, in the Korean Intellectual Property Receiving Office and claiming priority to Korean Patent Application No. 10-2019-0078314, filed on Jun. 28, 2019, in the Korean Intellectual Property Office, the disclosures of which are incorporated by reference herein in their entireties.

BACKGROUND

Field

The disclosure relates to a technology for processing image data by an electronic device.

Description of Related Art

Display devices having various performances have been distributed, and thus, video contents in various formats have been provided. For example, in addition to existing standard dynamic range (SDR) contents, high dynamic range (HDR) contents for displaying an image in a manner similar to that in which a person perceives an object with his eyes by more finely dividing the contrast have been provided. In addition, as the performance of electronic devices is improved, devices capable of creating or editing high dynamic range contents are increasingly popular.

When the brightness and color range of the high dynamic range contents exceed the performance of a display device, or the display device cannot support the output of the high dynamic range contents, tone mapping of the high dynamic range contents may be performed in a format supportable by the display device.

In this case, in order to provide a more realistic image and more accurately reflect the intention of a producer, when tone mapping is performed, an imaging technique that applies independent tone mapping for each frame or scene, rather than uniformly applying it to the entire high dynamic range contents may be used.

SUMMARY

Embodiments of the disclosure provide an apparatus for producing contents including dynamic metadata that applies independent tone mapping for each frame or scene of high dynamic range contents, an apparatus for serving the same, and an apparatus for reproducing the same.

According to an example embodiment of the disclosure, an electronic device includes: a memory, and a processor electrically connected to the memory, wherein the memory stores a high dynamic range image and a plurality of dynamic metadata including dynamic tone mapping information corresponding to a plurality of frames included in the high dynamic range image, and wherein the memory stores instructions that, when executed, cause the processor to: control the electronic device to transmit a packet including data obtained by combining one frame among the plurality of frames and one dynamic metadata corresponding to the one frame among the plurality of dynamic metadata to an external electronic device in response to an image request from the external electronic device.

According to an example embodiment of the disclosure, an electronic device includes: a display, a memory, and a processor electrically connected to the display and the memory, wherein the memory stores instructions that, when executed, cause the processor to: control the electronic device to receive one frame included in a high dynamic range image from an external electronic device, control the electronic device to receive one dynamic metadata including dynamic tone mapping information corresponding to the frame from the external electronic device, reproduce, through the display, a dynamic tone mapping applied image to which independent tone mapping is applied to the high dynamic range image for each frame or for each scene including a plurality of frames based on the received frame and the received dynamic metadata.

According to various example embodiments of the disclosure, it is possible to create, service, and/or play contents including dynamic metadata that applies independent tone mapping for each frame or scene of high dynamic range contents while using the minimum or reduced storage space of an electronic device.

In addition, various effects that are directly or indirectly understood through the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Various example embodiments of the disclosure will be described with reference to accompanying drawings. Accordingly, those of ordinary skill in the art will recognize that various modifications, equivalents, and/or alternatives on the various example embodiments described herein can be variously made without departing from the scope and spirit of the present disclosure.

Figure 1:
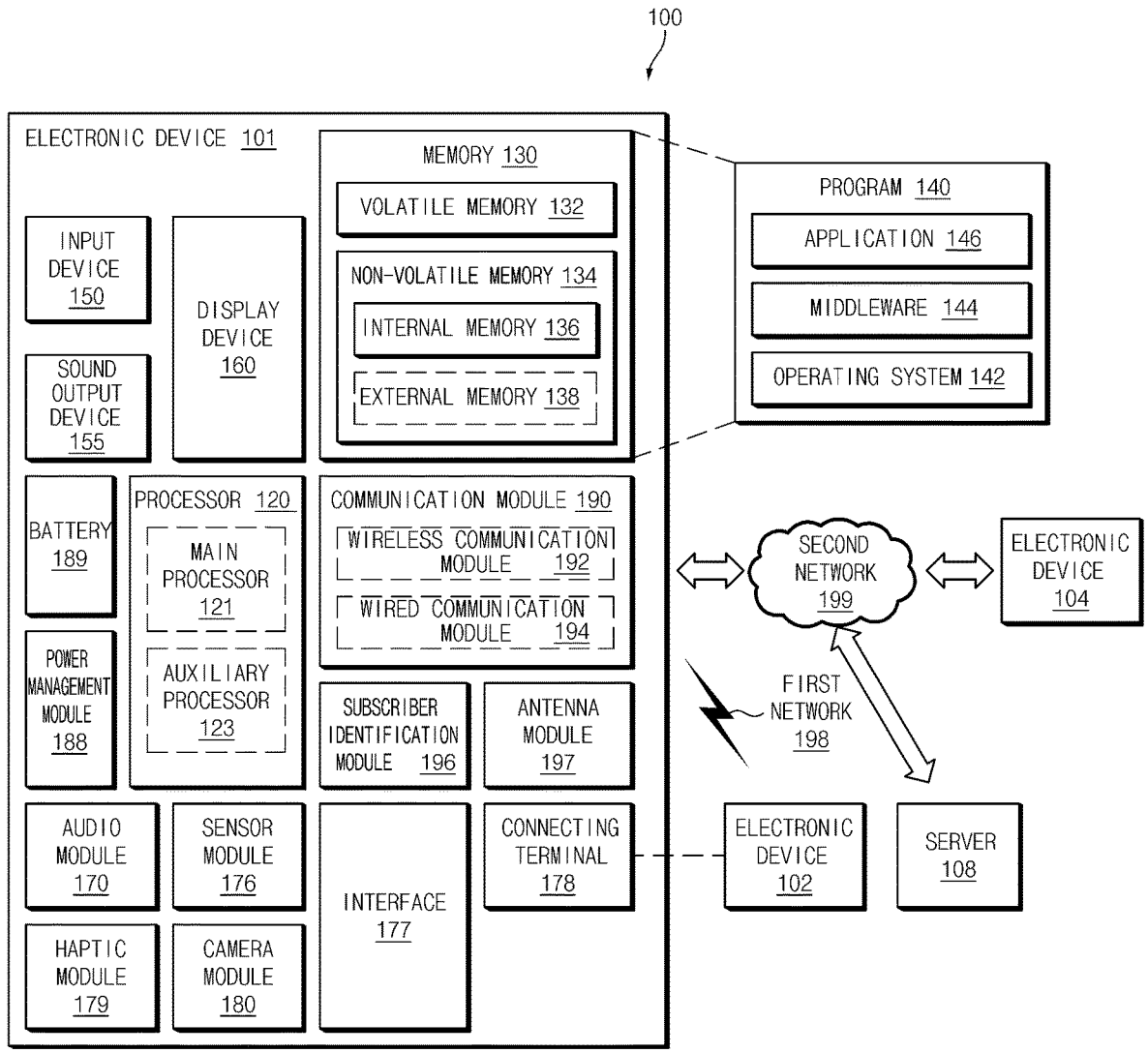
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example. Hereinafter, example operations of an electronic device according to various example embodiments will be described in greater detail with reference to FIGS. 2 and 3.

Figure 2:
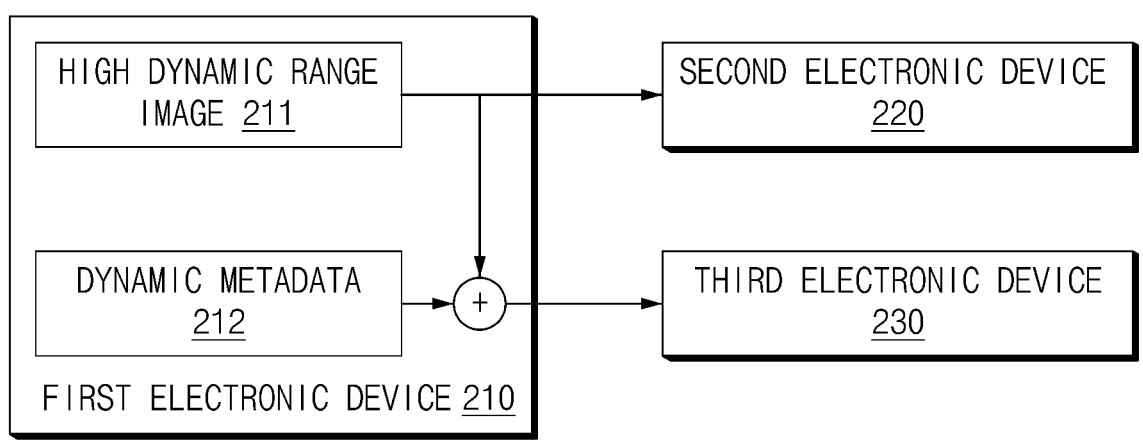
FIG. 2 is a block diagram illustrating an example operation of an electronic device according to various embodiments.
Figure 3:
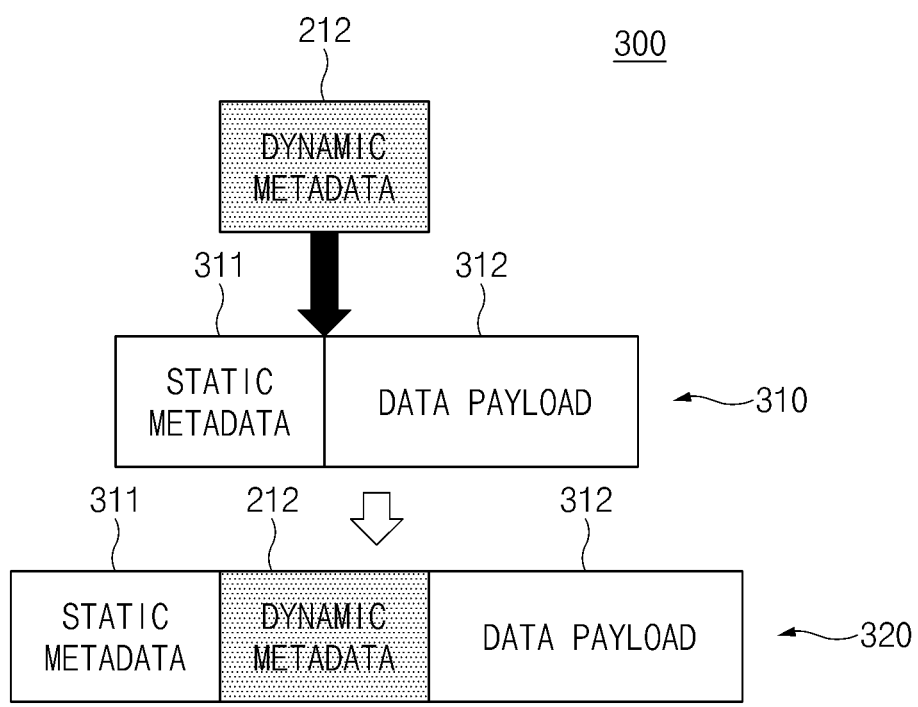
FIG. 3 is a diagram illustrating an example structure of data transmitted by an electronic device according to various embodiments.

FIG. 2 is a block diagram 200 illustrating an example operation of an electronic device according to various embodiments. FIG. 3 is a diagram illustrating an example structure 300 of data transmitted by an electronic device according to various embodiments. Hereinafter, the same or similar components may be described with the same reference numerals, and duplicate descriptions of the same components may be omitted.

Hereinafter, an operation of an electronic device described with reference to FIGS. 2 and 3 may be performed by an electronic device (e.g., the electronic device 101 of FIG. 1) or a processor (e.g., the processor 120 of FIG. 1) included in the electronic device.

Referring to FIG. 2, a first electronic device 210 may include a high dynamic range image 211 and dynamic metadata 212. The description of the first electronic device 210 may be the same as or similar to that of the electronic device 101 of FIG. 1 described above. The first electronic device 210 may store the high dynamic range image 211 and the dynamic metadata 212 in a memory (not shown, e.g., the memory 130 of FIG. 1) of the first electronic device 210.

According to an embodiment, the high dynamic range image 211 may include a high dynamic range (HDR) image expressed by brightness and color information having a wide range compared to a standard dynamic range (SDR) image. According to an embodiment, the high dynamic range image 211 may include an HDR 10 image of which the color gamut meets at least a part of BT.2020 which is a standard established by the International Telecommunication union (ITU) and the perceptual quantizer (PQ) gamma meets at least a part of ST.2084 which is a standard established by the Society of Motion Picture and Television Engineers (SMPTE).

According to an embodiment, the dynamic metadata 212 may not include information about static tone mapping uniformly applied to the entire sequence of a high dynamic range image (e.g., HDR 10 image) 211, but information about dynamic tone mapping that applies tone mapping to each frame or scene of the high dynamic range image 211. According to an embodiment, the dynamic metadata 212 may meet at least a part of ST.2094 which is a standard established by SMPTE. According to an embodiment, the first electronic device 210 may analyze the high dynamic range image 211 to form the dynamic metadata 212.

The first electronic device 210 may transmit the high dynamic range image 211 to a second electronic device 220 in response to an image request from the second electronic device 220. The description of the second electronic device 220 may be the same as or similar to that of the electronic device 101 of FIG. 1 described above. The first electronic device 210 may include a list of devices supporting a high dynamic range image (e.g., HDR 10 image) and devices supporting an image (e.g., HDR 10+ image) to which dynamic tone mapping is applied. The first electronic device 210 may determine whether the second electronic device 220 requesting an image corresponds to a device supporting a high dynamic range image or a device supporting an image to which dynamic tone mapping is applied. According to an embodiment, the first electronic device 210 may compare the device name or identifier of the second electronic device 220 included in the image request of the second electronic device 220 with the list of the first electronic device 210. According to an embodiment, when it is determined that the second electronic device 220 corresponds to a device supporting a high dynamic range image, the first electronic device 210 may transmit the high dynamic range image 211 to the second electronic device 210. According to an embodiment, the second electronic device 220 may request a high dynamic range image from the first electronic device 210. In this case, the first electronic device 210 may omit the operation of comparing the second electronic device 220 with the list and may determine the second electronic device 220 as a device supporting a high dynamic range image.

Referring to FIGS. 2 and 3, the first electronic device 210 may divide the high dynamic range image 211 into a plurality of packets for transmission, and at least one of the plurality of packets may include a first data structure 310. In the disclosure, the packet may satisfy the structure of a supplemental enhancement information (SEI) message defined by the moving picture experts group (MPEG).

The first data structure 310 may include static metadata 311 and at least some frames of the high dynamic range image 211. At least some frames of the high dynamic range image 211 may be included in a data payload 312.

The static metadata 311 may include information on static tone mapping uniformly applied to the entire sequence of the high dynamic range image 211. According to an embodiment, the static metadata 311 may satisfy at least a part of ST.2086 which is a standard established by SMPTE. The static metadata 311 may be defined once for the entire sequence of the high dynamic range image 211. According to an embodiment, the data payload 312 of the first data structure 310 may include an initial frame of the high dynamic range image 211. The static metadata 311 may be located before the data payload 312 to provide tone mapping information for the entire sequence of the high dynamic range image 211 to a receiving end.

Referring again to FIG. 2, the first electronic device 210 may transmit an image to which dynamic tone mapping is applied to a third electronic device 230 in response to an image request of the third electronic device 230. The description of the third electronic device 230 may be the same as or similar to that of the electronic device 101 of FIG. 1 described above. In this case, the first electronic device 210 may combine the high dynamic range image 211 and the dynamic metadata 212 included in the first electronic device 210 and transmit an image to which dynamic tone mapping is applied to the third electronic device 230.

The first electronic device 210 may determine whether the third electronic device 230 requesting an image corresponds to a device supporting a high dynamic range image (e.g., an HDR 10 image) or a device supporting an image (e.g., an HDR 10+ image) to which dynamic tone mapping is applied. According to an embodiment, the first electronic device 210 may compare the device name or identifier of the third electronic device 230 included in the image request of the third electronic device 230 with the list of the first electronic device 210.

According to an embodiment, the third electronic device 230 may request an image to which dynamic tone mapping is applied from the first electronic device 210. In this case, the first electronic device 210 may omit the operation of comparing the third electronic device 230 with the list and identify that the third electronic device 230 corresponds to a device supporting an image to which dynamic tone mapping is applied.

According to an embodiment, when it is determined that the third electronic device 230 corresponds to a device supporting an image (e.g., an HDR 10+ image) to which dynamic tone mapping is applied, the first electronic device 210 may transmit the image to which dynamic tone mapping is applied to the third electronic device 230.

Referring again to FIGS. 2 and 3, the first electronic device 210 may divide the image to which dynamic tone mapping is applied into a plurality of packets to transmit the image, and at least one of the plurality of packets may include a second data structure 320. The first electronic device 210 may combine the dynamic metadata 212 with the first data structure 310 to form the second data structure 320. The first electronic device 210 may add the dynamic metadata 212 to the first data structure 310 such that the dynamic metadata 212 is placed before the data payload 312. According to an embodiment, at least some frames of the high dynamic range image 211 may be included in the data payload 312, and the dynamic metadata 212 placed before the data payload 312 may include the tone mapping information on at least some frames of the high dynamic range image 211 included in the data payload 312.

The first electronic device 210 according to various embodiments of the disclosure may provide the image to which full dynamic tone mapping is applied without needing to store an image to which dynamic tone mapping in which the entire high dynamic range image is combined with a plurality of dynamic metadata corresponding to each frame or each scene of the high dynamic range image only when the high dynamic range image 211 and the dynamic metadata 212 for the high dynamic range image 211 are stored. When the first electronic device 210 intends to transmit an image to which dynamic tone mapping is applied, the first electronic device 210 may combine and transmit at least some frames of the image to which dynamic tone mapping is applied and the dynamic metadata corresponding to the frames like the second data structure 320 of FIG. 3 using the high dynamic range image 211 stored in the first electronic device 210 and the dynamic metadata 212 on the high dynamic range image 211.

Accordingly, in addition to the storage space corresponding to the size of the high dynamic range image 211, the first electronic device 210 may additionally use only the storage space corresponding to the size of the dynamic metadata 212 for the high dynamic range image 211 instead of using the storage space corresponding to the size of the entire image to which dynamic tone mapping is applied. In addition, when combining the high dynamic range image 211 and the dynamic metadata 212, a buffer space corresponding to at least some frames of an image to which dynamic tone mapping is applied and the size of the dynamic metadata corresponding to the frame may be used. For example, the first electronic device 210 may use a buffer space corresponding to the second data structure 320 to form and transmit the second data structure 320.

For example, when the first electronic device 210 stores all two different images of a high dynamic range image (e.g., HDR 10 image) and an image (e.g., HDR 10+ image) to which dynamic tone mapping is applied for one content and transmits the high dynamic range image to a device supporting a high dynamic range image and the image to which dynamic tone mapping is applied to a device supporting an image to which dynamic tone mapping is applied, and when it is assumed that the size corresponding to 2 hours of 10 Mbps FHD (1920×1080) video is about 9 Gigabytes, the first electronic device 210 requires a storage space of 18 Gigabytes, which is about twice the size of the image.

However, according to an embodiment of the disclosure, in the case of an HDR 10+ image, the dynamic metadata size may correspond to about 380 bits per frame. For example, assuming 30 fps of FHD (1920×1080), when the dynamic metadata of every frame is stored in the first electronic device 210 for 2 hours, it is possible to process the HDR 10+ image only using a storage space of about 10 Mbytes. Because dynamic metadata has the same size regardless of the size of the image, even when the image is UHD (3840×2160), it is possible to process an HDR 10+ image using about a storage space of 10 Mbytes for 2 hours.

Figure 10:
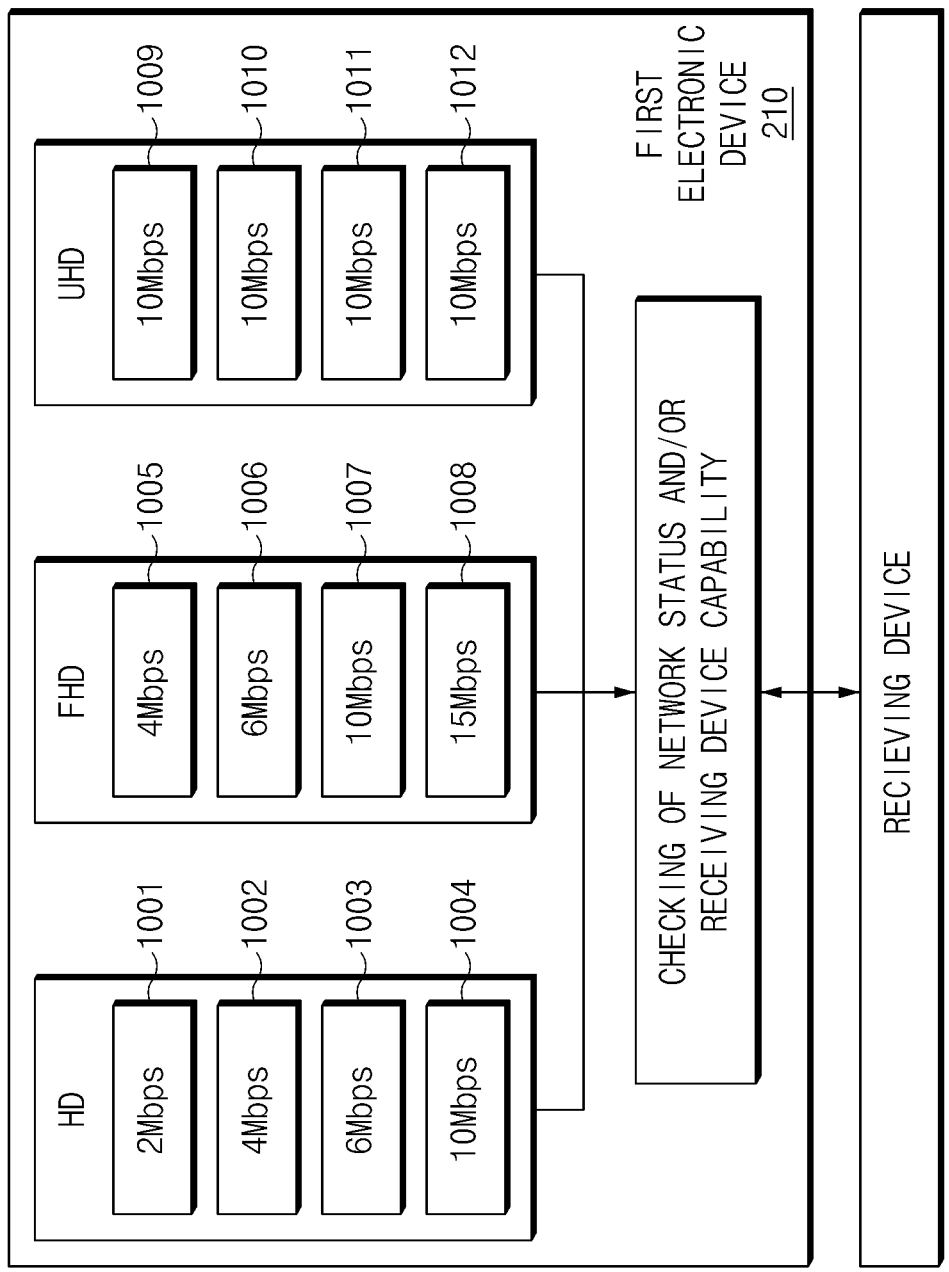
FIG. 10 is a block diagram illustrating an example operation of an electronic device according to various embodiments.

In addition, referring to FIG. 10, according to an embodiment of the disclosure, when the first electronic device 210 provides a streaming service, a plurality of contents 1001, 1002, 1003, . . . , 1012 that correspond to different bit rates (e.g., 2 Mbps, 4 Mbps, 6 Mbps, and 10 Mbps) and resolutions (HD, FHD, UHD) may be generated in advance and stored in the first electronic device 210 depending on the network condition and the processing capabilities of receiving devices, and then, the contents may be selectively transmitted depending on the condition of the processing capability of a network or receiving device. In this case, when an image (e.g., an HDR10+ image) to which dynamic tone mapping is applied is to be provided, the dynamic metadata may be equally applied to all the plurality of contents 1001, 1002, 1003, . . . , 1012. Accordingly, the first electronic device 210 may store only one dynamic metadata per frame (or per scene) on behalf of the plurality of contents 1001, 1002, 1003, . . . , 1012, regardless of the bitrate and resolution. Accordingly, when the first electronic device 210 provides the plurality of contents 1001, 1002, 1003, . . . , 1012 having various bit rates and resolutions, the storage space efficiency may be further maximized.

In addition, the above example corresponds to the maximum required storage space size when it is assumed that dynamic metadata is applied to all frames. Because dynamic metadata is applied every time the scene corresponding to a plurality of frames, not all frames, is changed, the required storage space size may be less than that of the above-described example.

In addition, for example, when it is assumed that the first electronic device 210 transmits an image to which dynamic tone mapping is applied without distinguishing between a device supporting a high dynamic range image (e.g., HDR 10 image) and a device supporting an image (e.g., HDR 10+ image) to which dynamic tone mapping is applied, the second electronic device 220 that has received the image to which the dynamic tone mapping is applied must have a function of skipping or ignoring and processing the dynamic metadata 212 of FIG. 3, and a device without the corresponding functions may cause an error during processing. However, according to various embodiments of the disclosure, it is possible to distinguish between a device supporting a high dynamic range image (e.g., HDR 10 image) and a device supporting an image (e.g., HDR 10+ image) to which dynamic tone mapping is applied to provide a suitable image while minimizing or reducing the storage space use of the first electronic device 210. Therefore, according to various embodiments of the disclosure, it is possible to provide an electronic device that provides both the HDR 10 service and the HDR 10+ service while minimizing or reducing the use of storage space.

Hereinafter, a method of transmitting an image to which dynamic tone mapping is applied according to various embodiments will be described in greater detail with reference to FIG. 4.

Figure 4:
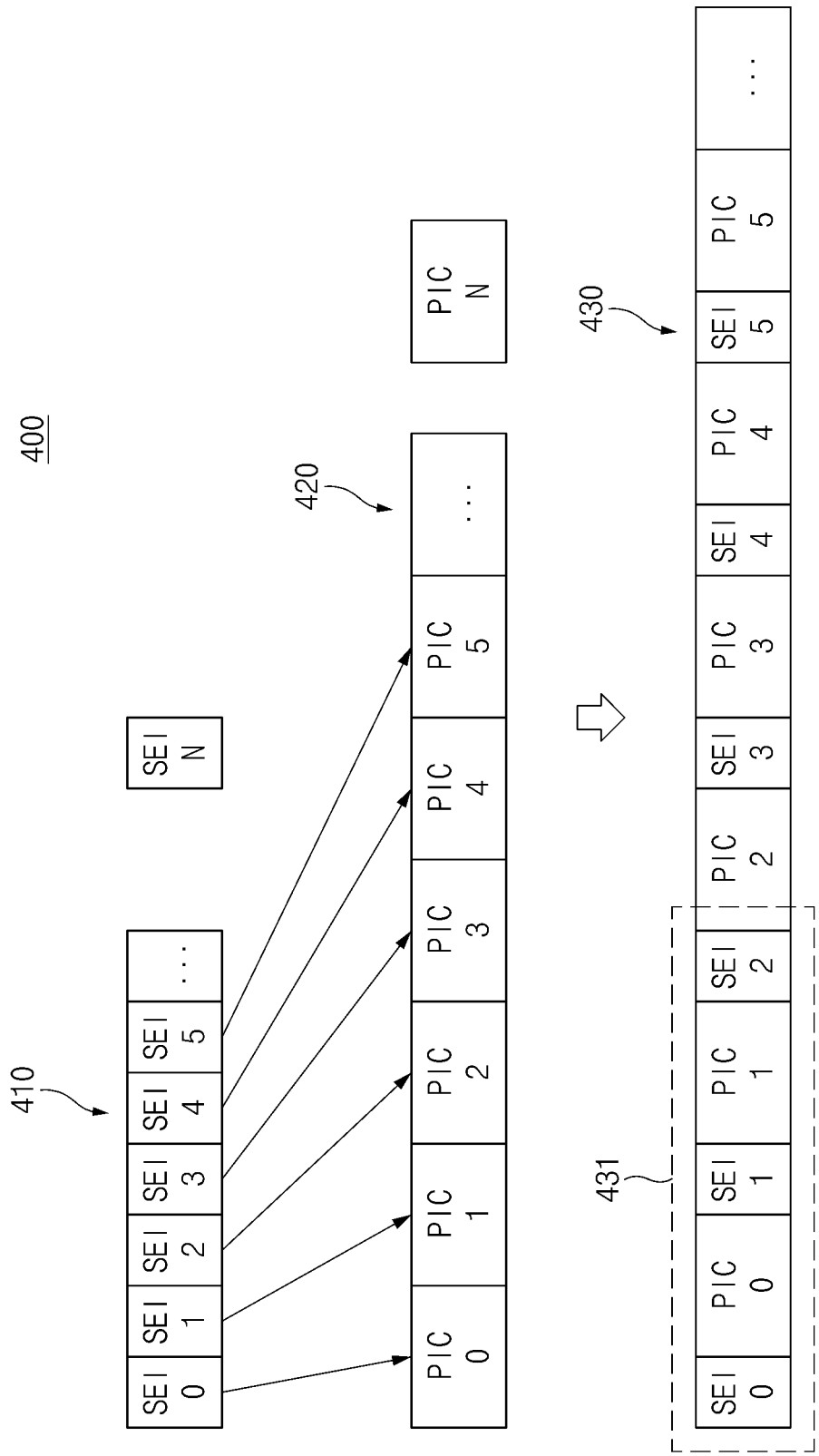
FIG. 4 is a diagram illustrating an example method of transmitting an image to which dynamic tone mapping of an electronic device is applied, according to various embodiments.

FIG. 4 is a diagram illustrating an example method 400 of transmitting an image to which dynamic tone mapping of an electronic device is applied, according to an embodiment. Hereinafter, the same or similar components may be described with the same reference numerals, and duplicate descriptions of the same components may be omitted.

Hereinafter, an operation of an electronic device described with reference to FIG. 4 may be performed by an electronic device (e.g., the electronic device 101 of FIG. 1) or a processor (e.g., the processor 120 of FIG. 1) included in the electronic device.

Referring to FIG. 4, the first electronic device may store a high dynamic range image (e.g., HDR 10 image) 420 and a plurality of dynamic metadata (SEI 0, SEI 1, . . . , SEI N) 410. The high dynamic range image 420 may include a plurality of frames PIC 0, PIC 1, . . . , PIC N. The plurality of dynamic metadata 410 may correspond to the plurality of frames, respectively.

The first electronic device may insert the first dynamic metadata SEI 0 corresponding to the first frame PIC 0 before the first frame PIC 0 of the high dynamic range image (e.g., HDR 10 image) 420, and insert the second dynamic metadata SEI 1 corresponding to the second frame PIC 1 before the second frame PIC 1 to transmit an image (e.g., HDR 10+ image) 430 to which dynamic tone mapping is applied to the third electronic device. The first electronic device may divide and transmit the image 430 to which dynamic tone mapping is applied by a size 431 corresponding to the size of the packet. According to an embodiment, because a start prefix code, by which a plurality of frames PIC 0, PIC 1, ..., PIC N can be distinguished from each other, exists before the plurality of frames PIC 0, PIC 1, ..., PIC N within the high dynamic range image (e.g., HDR 10 image) 420, it is possible to insert a plurality of dynamic metadata (SEI 0, SEI 1, ..., SEIN N) 410 between the plurality of frames PIC 0, PIC 1, ..., PIC N based on the start prefix code.

Hereinafter, a method of transmitting an image to which dynamic tone mapping is applied according to various embodiments will be described in greater detail with reference to FIG. 5.

Figure 5:
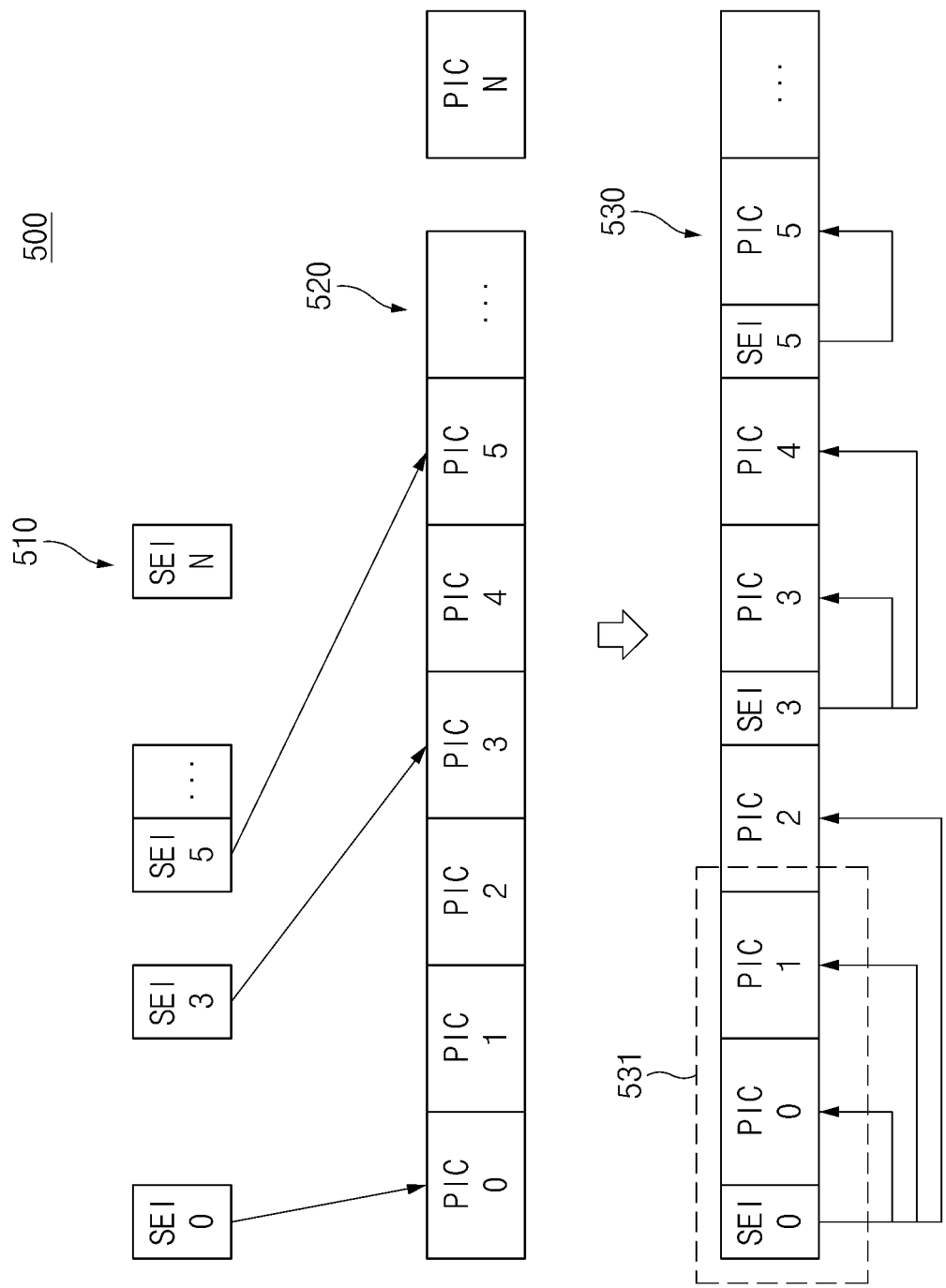
FIG. 5 is a diagram illustrating an example method of transmitting an image to which dynamic tone mapping of an electronic device is applied, according to various embodiments.

FIG. 5 is a diagram illustrating an example method 500 of transmitting an image to which dynamic tone mapping of an electronic device is applied, according to various embodiments. Hereinafter, the same or similar components may be described with the same reference numerals, and duplicate descriptions of the same components may be omitted.

Hereinafter, an operation of an electronic device described with reference to FIG. 5 may be performed by an electronic device (e.g., the electronic device 101 of FIG. 1) or a processor (e.g., the processor 120 of FIG. 1) included in the electronic device.

Referring to FIG. 5, the first electronic device may store a high dynamic range image (e.g., HDR 10 image) 520 and a plurality of dynamic metadata (SEI 0, SEI 3, ..., SEI N) 510. The high dynamic range image 520 may include a plurality of frames PIC 0, PIC 1, ..., PIC N.

The plurality of dynamic metadata (SEI 0, SEI 3, ..., SEI N) 510 may correspond to specific frames, respectively. In this case, each of the plurality of dynamic metadata (SEI 0, SEI 3, ..., SEI N) 510 may include frame index information indicating which frame the corresponding specific frame is.

According to an embodiment, the first dynamic metadata SEI 0 may correspond to the first frame PIC 0, the second dynamic metadata SEI 3 may correspond to the fourth frame PIC 3, and the third dynamic metadata SEI 5 may correspond to the sixth frame PIC 5. In this case, the first dynamic metadata SEI 0 may include frame index information on the first frame PIC 0, the second dynamic metadata SEI 3 may include frame index information on the fourth frame PIC 3, and the third dynamic metadata SEI 5 may include frame index information on the sixth frame PIC 5. In addition, in this case, the application range of the first dynamic metadata SEI 0 may be up to the third frame PIC 2 before the second dynamic metadata SEI 3, which is the next dynamic metadata. When one dynamic metadata is applied to a plurality of frames, the plurality of frames may correspond to one scene. According to an embodiment, when a scene is changed and a change in brightness occurs, the first electronic device may store dynamic metadata together with index information of the first frame of the corresponding scene.

The first electronic device may insert the first dynamic metadata SEI 0 corresponding to the first frame PIC 0 before the first frame PIC 0 of the high dynamic range image (e.g., HDR 10 image) 520, and insert the second dynamic metadata SEI 3 corresponding to the fourth frame PIC 3 before the fourth frame PIC 3 in order to transmit the image (e.g., HDR 10+ image) 530 to which the dynamic tone mapping is applied to the third electronic device. The first electronic device may divide and transmit the image 530 to which the dynamic tone mapping is applied by a size 531 corresponding to the size of the packet. According to an embodiment, because a start prefix code, by which a plurality of frames PIC 0, PIC 1, ..., PIC N can be distinguished from each other, exists before the plurality of frames PIC 0, PIC 1, ..., PIC N within the high dynamic range image (e.g., HDR 10 image) 520, it is possible to insert a plurality of dynamic metadata (SEI 0, SEI 3, ..., SEI N) 510 between the plurality of frames PIC 0, PIC 1, ..., PIC N based on the start prefix code.

Hereinafter, an operation of an electronic device according to an embodiment will be described in greater detail with reference to FIGS. 6 and 7.

Figure 6:
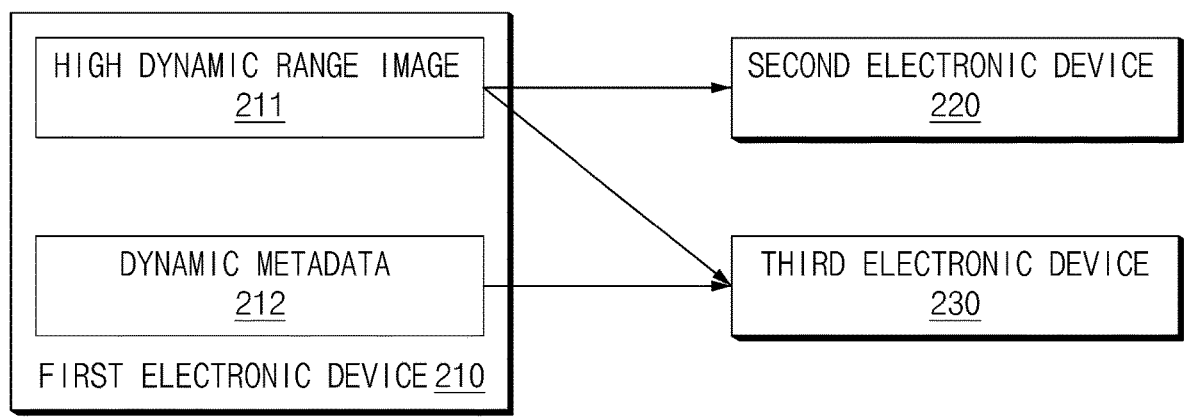
FIG. 6 is a block diagram illustrating an example operation of an electronic device according to various embodiments.

FIG. 6 is a block diagram 600 illustrating an example operation of an electronic device according to various embodiments. FIG. 7 is a block diagram 700 illustrating an example method of processing data by an electronic device according to various embodiments. Hereinafter, the same or similar components may be described with the same reference numerals, and duplicate descriptions of the same components may be omitted.

Hereinafter, an operation of an electronic device described with reference to FIGS. 6 and 7 may be performed by an electronic device (e.g., the electronic device 101 of FIG. 1) or a processor (e.g., the processor 120 of FIG. 1) included in the electronic device.

Referring to FIG. 6, the first electronic device 210 may transmit the high dynamic range image 211 to the second electronic device 220 in response to an image request from the second electronic device 220. When it is determined that the second electronic device 220 corresponds to a device supporting a high dynamic range image, the first electronic device 210 may transmit the high dynamic range image 211 to the second electronic device 220.

The first electronic device 210 may determine whether the third electronic device 230 requesting an image corresponds to a device supporting a high dynamic range image (e.g., an HDR 10 image) or a device supporting an image (e.g., an HDR 10+ image) to which dynamic tone mapping is applied. When it is determined that the third electronic device 230 corresponds to a device supporting an image (e.g., HDR 10+ image) to which dynamic tone mapping is applied, the first electronic device 210 may transmit the high dynamic range image 211 to the third electronic device 230, and may separately transmit the dynamic metadata 212 corresponding to the high dynamic range image 211 to the third electronic device 230.

The third electronic device 230 may determine whether the first electronic device 210 transmits only the high dynamic range image 211 or information on the image to which the dynamic tone mapping is applied, based on a specific identifier transmitted by the first electronic device 210 or by receiving the dynamic metadata 212 according to an embodiment.

Figure 7:
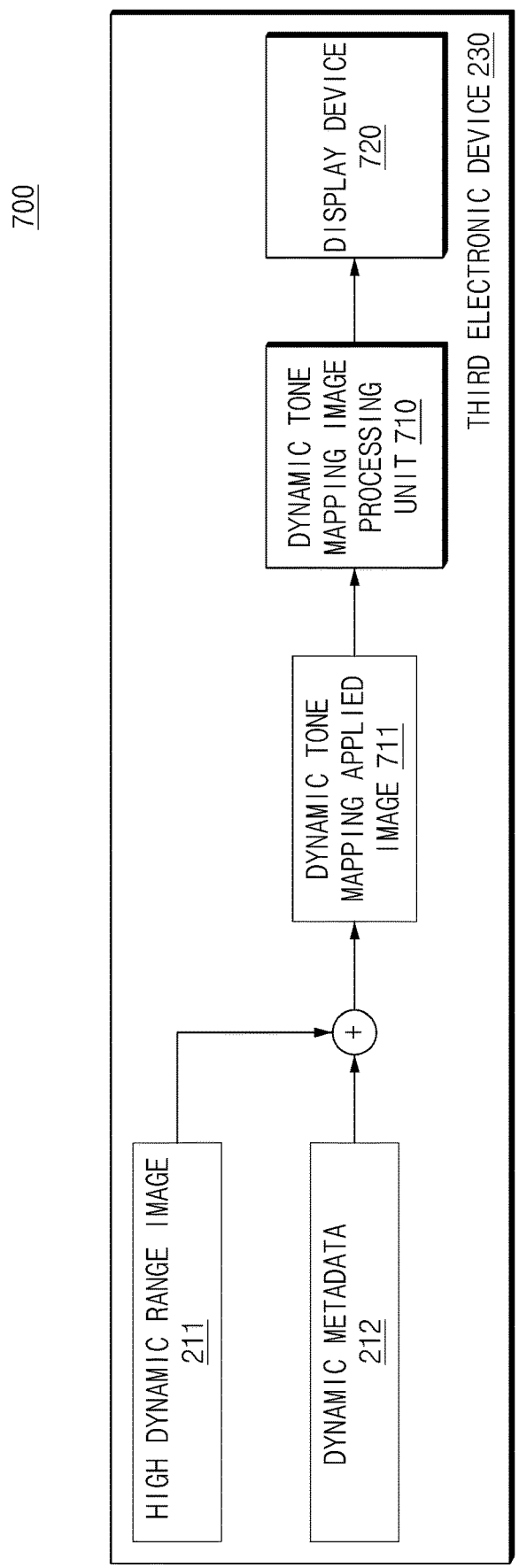
FIG. 7 is a block diagram illustrating an example method of processing data by an electronic device according to various embodiments.

Referring to FIG. 7, the third electronic device 230 may add the dynamic metadata 212 to the received high dynamic range image 211 to form an image (e.g., HDR 10+ image) 711 to which dynamic tone mapping is applied. A method of forming the image 711 to which dynamic tone mapping is applied may be the same as or similar to the method described above with reference to FIG. 4 or 5. However, in FIGS. 4 and 5, although the first electronic device 210 forms and transmits the images 430 and 530 to which the dynamic tone mapping is applied, as in the embodiment of FIG. 7, the third electronic device 230 may form the image 711 to which dynamic tone mapping is applied when receiving the high dynamic range image 211 and the dynamic metadata 212 separately.

According to an embodiment, the third electronic device 230 may form an image to which dynamic tone mapping corresponding to the entire frame of the high dynamic range image 211 is applied and process it, and in the case of streaming, may form and process an image to which dynamic tone mapping is applied corresponding to "n" frames of the high dynamic range image 211 in the order received by the third electronic device 230.

The third electronic device 230 may process the formed image 711 to which dynamic tone mapping is applied in a dynamic tone mapping image processing unit (e.g., including various circuitry and/or executable program instructions) 710 to display the image on a display device 720 (e.g., the display device 160 of FIG. 1).

Hereinafter, an operation of an electronic device according to an embodiment will be described in greater detail with reference to FIGS. 6 and 8.

Figure 8:
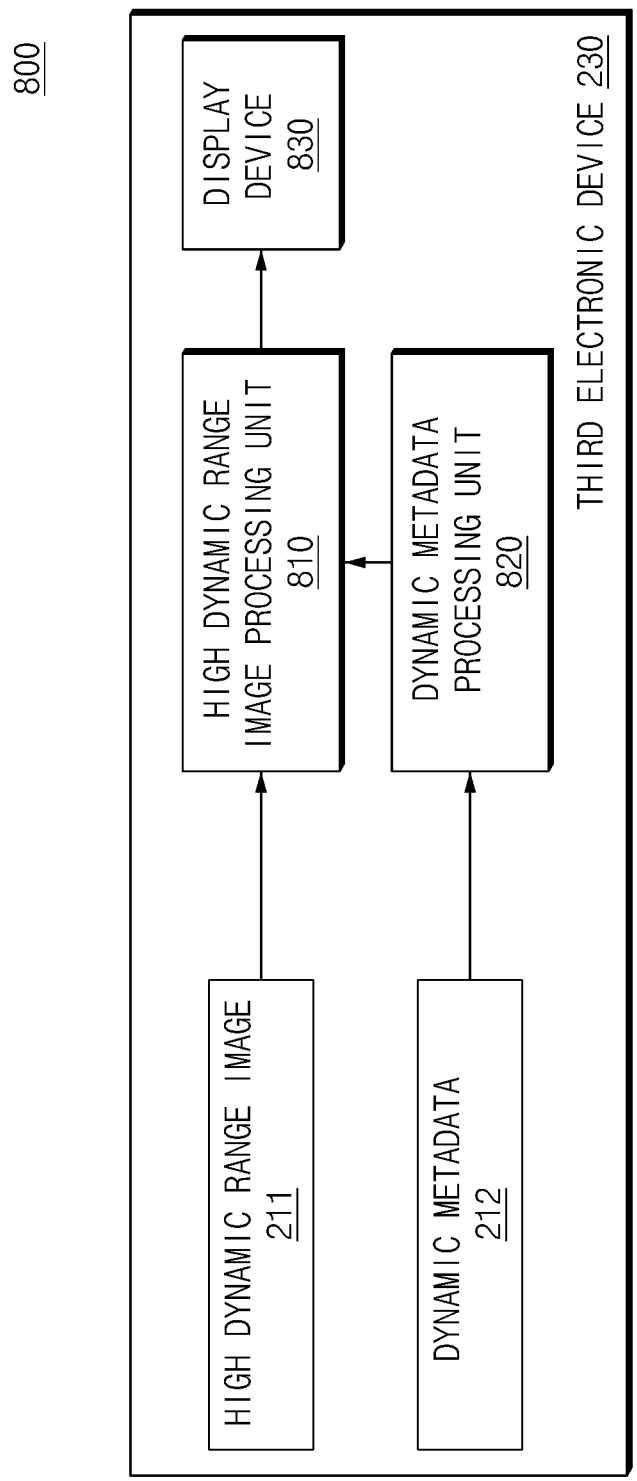
FIG. 8 is a block diagram illustrating an example method of processing data by an electronic device according to various embodiments.

FIG. 8 is a block diagram 800 illustrating an example method of processing data by an electronic device according to various embodiments. Hereinafter, the same or similar components may be described with the same reference numerals, and duplicate descriptions of the same components may be omitted.

Hereinafter, an operation of an electronic device described with reference to FIGS. 6 and 8 may be performed by an electronic device (e.g., the electronic device 101 of FIG. 1) or a processor (e.g., the processor 120 of FIG. 1) included in the electronic device.

The first electronic device 210 may determine whether the third electronic device 230 requesting an image corresponds to a device supporting a high dynamic range image (e.g., an HDR 10 image) or a device supporting an image (e.g., an HDR 10+ image) to which dynamic tone mapping is applied. When it is determined that the third electronic device 230 corresponds to a device supporting an image (e.g., HDR 10+ image) to which dynamic tone mapping is applied, the first electronic device 210 may transmit the high dynamic range image 211 to the third electronic device 230, and may separately transmit the dynamic metadata 212 corresponding to the high dynamic range image 211 to the third electronic device 230.

Referring to FIG. 8, the third electronic device 230 may transmit the received high dynamic range image 211 to a high dynamic range image processing unit (e.g., including various circuitry and/or executable program instructions) 810 and transmit the dynamic metadata 212 to a dynamic metadata processing unit (e.g., including various circuitry and/or executable program instructions) 820, so that it is possible to process the high dynamic range image 211 and the dynamic metadata 212 while synchronizing the high dynamic range image 211 and the dynamic metadata 212. According to an embodiment, when the dynamic metadata 212 is present in every frame of the high dynamic range image 211, the high dynamic range image processing unit 810 and the dynamic metadata processing unit 820 may transmit the high dynamic range image 211 and the dynamic metadata 212 to the display device 830 in synchronization so that one dynamic metadata corresponds to one frame. According to an embodiment, when the dynamic metadata 212 exists for each scene including a plurality of frames of the high dynamic range image 211, the high dynamic range image processing unit 810 and the dynamic metadata processing unit 820 may transmit the high dynamic range image 211 and the dynamic metadata 212 to the display device 830 in synchronization so that one dynamic metadata corresponds to one scene.

According to an embodiment, the third electronic device 230 may receive all the frames of the high dynamic range image 211 and all the dynamic metadata corresponding to all the frames and then process them. In case of streaming, in the receiving order of the third electronic device 230, "n" frames and the high dynamic metadata corresponding to the "n" frames may be transmitted to and processed by the high dynamic range image processing unit 810 and the metadata processing unit 820.

The third electronic device 230 may receive the result processed by the high dynamic range image processing unit 810 and the metadata processing unit 820 and display the image to which the dynamic tone mapping is applied on the display device 830.

Hereinafter, an operation of an electronic device according to an embodiment will be described in greater detail with reference to FIGS. 6 and 9. Hereinafter, the same components may be described with the same reference numerals, and duplicate descriptions of the same components may be omitted.

Figure 9:
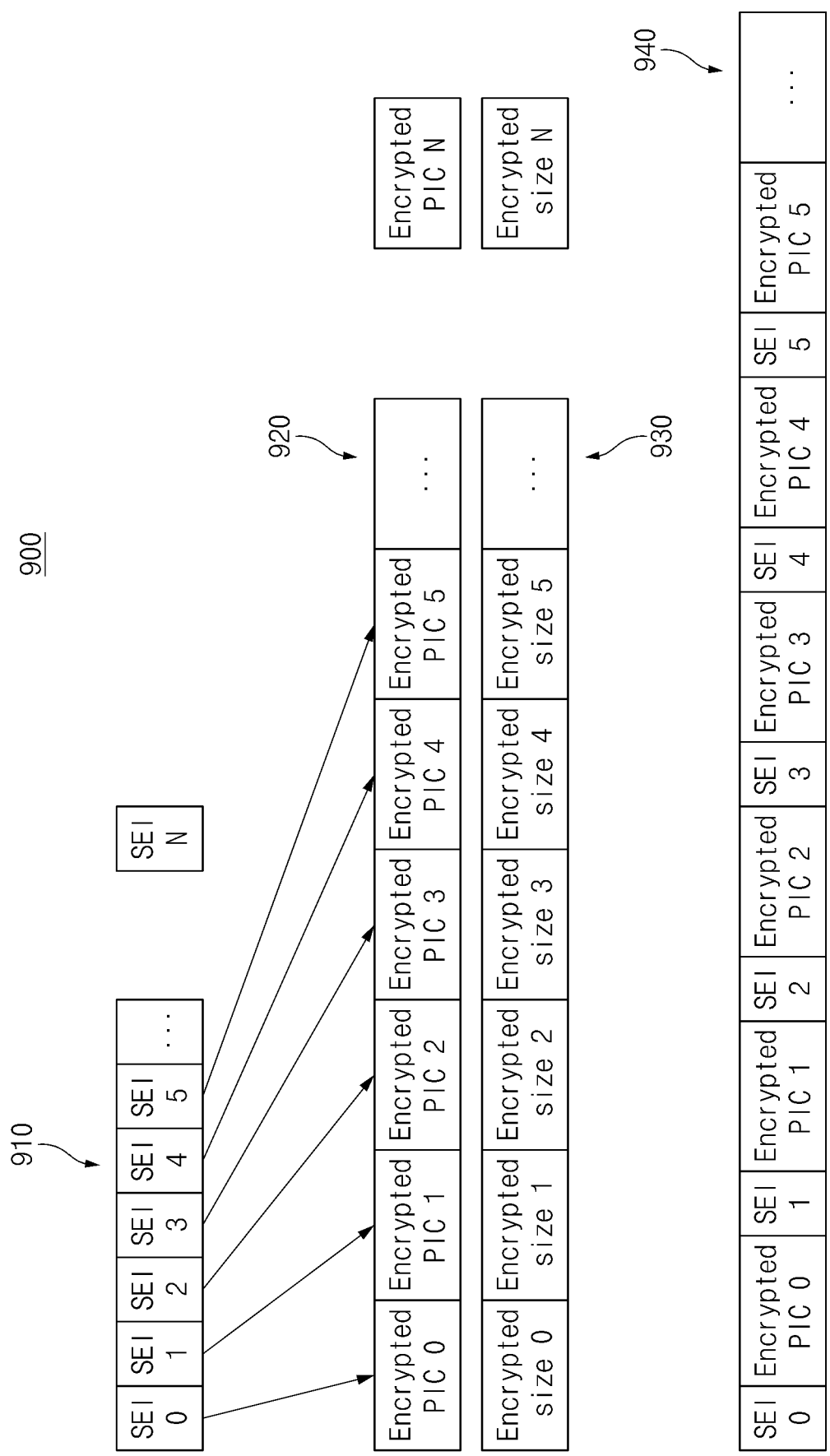
FIG. 9 is a diagram illustrating an example method of transmitting an image to which dynamic tone mapping of an electronic device is applied, according to various embodiments.

FIG. 9 is a diagram illustrating an example method 900 of transmitting an image to which dynamic tone mapping of an electronic device is applied, according to various embodiments.

Hereinafter, an operation of an electronic device described with reference to FIGS. 6 and 9 may be performed by an electronic device (e.g., the electronic device 101 of FIG. 1) or a processor (e.g., the processor 120 of FIG. 1) included in the electronic device.

Referring to FIG. 9, according to an embodiment, a high dynamic range image 920 stored in the first electronic device may be encrypted. According to an embodiment, when the high dynamic range image 920 is encrypted in units of frames, the first electronic device may add corresponding dynamic metadata 910 to the front of the frame using frame size information 930 to form an image 940 to which dynamic tone mapping is applied.

Although not illustrated in FIG. 9, according to an embodiment, the first electronic device may add the dynamic metadata 910 before each decrypted frame after decrypting the encrypted frames 920, and then re-encrypt the added dynamic metadata and frames together to form an image to which dynamic tone mapping is applied. According to an embodiment, the dynamic metadata may be separately encrypted while the frame is encrypted and added before the encrypted frame.

According to an embodiment, in order to initially generate the dynamic metadata 910, the high dynamic range image 920 must be analyzed in the first electronic device, so that the image before being encoded may be obtained once. In this case, when there is no information on a size of a payload encrypted in units of frame in the high dynamic range image 920 or the first electronic device, the first electronic device may store the information on the size of the payload encrypted in units of frame in the high dynamic range image 920 or therein.

Although not illustrated in FIG. 9, according to an embodiment, the high dynamic range image stored in the first electronic device may not be encrypted. In this case, when transmitting an image to a device supporting a high dynamic range image, the final end of the first electronic device may encrypt and transmit the high dynamic range image, and when transmitting an image to a device supporting an image to which dynamic tone mapping is applied, the final end of the first electronic device may encrypt and transmit the image to which dynamic tone mapping and in which the high dynamic range image and the dynamic metadata are combined.

Referring to FIG. 6, according to an embodiment, the first electronic device 210 may transmit the encrypted high dynamic range image 211 to the third electronic device 230, and may separately transmit the dynamic metadata 212 to the third electronic device 230. In this case, the dynamic metadata 212 may be encrypted and transmitted or transmitted in an unencrypted state.

The third electronic device 230 may decrypt the received high dynamic range image 211 and, when the received dynamic metadata 212 is encrypted, may also decrypt the dynamic metadata 212, thereby forming or reproducing an image to which dynamic tone mapping is applied. A method of processing the separately received high dynamic range image 211 and dynamic metadata 212 by the third electronic device 230 may be the same as or similar to the method described above with reference to FIG. 7 or 8.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a memory configured to store a high dynamic range image including information regarding static tone mapping uniformly applied to an entire frame of the high dynamic range image; and
a processor electrically connected to the memory, and configured to, in response to an image request from a first external electronic device supporting an image to which the static tone mapping is applied, control the electronic device to transmit a first packet including the high dynamic range image to the first external electronic device so that the first external electronic device can reproduce the high dynamic range image to which the static tone mapping is applied,
wherein the memory is further configured to store information regarding dynamic tone mapping for the high dynamic range image, wherein the information regarding dynamic tone mapping is configured to apply tone to each frame of the high dynamic range image, and,
wherein processor is further configured to:
in response to an image request from a second external electronic device supporting an image to which the dynamic tone mapping is applied, control the electronic device to transmit a second packet including the high dynamic range image and the information regarding dynamic tone mapping to the second external electronic device so that the second external electronic device can reproduce the high dynamic range image to which the dynamic tone mapping is applied.

2. The electronic device of claim 1, wherein the processor is configured to:
form the second packet such that a part of the information regarding dynamic tone mapping is placed before the each frame.

3. The electronic device of claim 1, wherein the processor is configured to:
form the second packet to further include at least one frame to which the part of the dynamic tone mapping is applied.

4. The electronic device of claim 3, wherein the information regarding dynamic tone mapping further includes index information of the frame.

5. The electronic device of claim 3, wherein the frame corresponds to a time point at which a scene is changed in the high dynamic range image.

6. The electronic device of claim 1, wherein the processor is configured to:
decrypt the frame based on the frame being encrypted, encrypt the second packet after combining the information regarding dynamic tone mapping and the frame to form the second packet, and control the electronic device to transmit the encrypted second packet to the second external electronic device.

7. The electronic device of claim 1, wherein the processor is configured to:
combine an encrypted frame and the information regarding dynamic tone mapping to form the second packet based on the frame being encrypted.

8. The electronic device of claim 1, wherein the processor is configured to:
encrypt the information regarding dynamic tone mapping based on the frame being encrypted, and combine the encrypted information regarding dynamic tone mapping and the encrypted frame to form the second packet.

9. The electronic device of claim 1, wherein the processor is configured to:
combine the frame and the information regarding dynamic tone mapping to form the second packet based on the frame not being encrypted, encrypt the second packet, and control the electronic device to transmit the encrypted second packet to the second external electronic device.

10. An electronic device comprising:
a display;
a memory; and
a processor electrically connected to the display and the memory,
wherein the processor is configured to:
control the electronic device to receive a packet including a high dynamic range image including information regarding static tone mapping uniformly applied to an entire frame of the high dynamic range image from an external electronic device,
control the electronic device to receive information regarding dynamic tone mapping for the received high dynamic range image from the external electronic device, wherein the information regarding dynamic tone mapping is configured to apply tone to each frame of the received high dynamic range image,
reproduce, through the display, a dynamic tone mapping applied image based on the high dynamic range image included in the received packet and the received the information regarding dynamic tone mapping.

11. The electronic device of claim 10, wherein the processor is configured to:
form the dynamic tone mapping applied image by combining the information regarding dynamic tone mapping and the frame such that the information regarding dynamic tone mapping is placed before the frame.

12. The electronic device of claim 10, wherein the processor is configured to:
control the electronic device to transmit an image request to the external electronic device, and allow the image request to include an identifier of the electronic device.

13. The electronic device of claim 10, wherein the processor is configured to:
form the dynamic tone mapping applied image such that at least one frame to which the information regarding dynamic tone mapping is applied is placed after the frame.

14. The electronic device of claim 13, wherein the information regarding dynamic tone mapping further includes index information of the frame.

15. The electronic device of claim 13, wherein the frame is a first frame of the scene.

16. The electronic device of claim 10, wherein the processor is configured to:
if the received frame is encrypted, decrypting the frame and combining the information regarding dynamic tone mapping and the frame to form the dynamic tone mapping applied image.

17. The electronic device of claim 10, wherein the processor is configured to:
for reproducing the dynamic tone mapping applied image, the frame and the information regarding dynamic tone mapping are synchronized and processed based on index information of the frame included in the information regarding dynamic tone mapping.

* * * * *